United States Patent
McEnaney et al.

(10) Patent No.: US 12,054,055 B2
(45) Date of Patent: Aug. 6, 2024

(54) SINGLE DISCONNECT SWITCH FOR MULTIPLE BATTERY SYSTEMS

(71) Applicant: Caterpillar Inc., Peoria, IL (US)

(72) Inventors: Ryan P. McEnaney, Clayton, NC (US); Kareem Gad, Raleigh, NC (US); Omar Baba, Peterborough (GB); James K. McCloskey, Cambridgeshire (GB)

(73) Assignee: Caterpillar Inc., Peoria, IL (US)

( * ) Notice: Subject to any disclaimer, the term of this patent is extended or adjusted under 35 U.S.C. 154(b) by 50 days.

(21) Appl. No.: 17/957,165

(22) Filed: Sep. 30, 2022

(65) Prior Publication Data
US 2024/0109422 A1    Apr. 4, 2024

(51) Int. Cl.
| | |
|---|---|
| H02P 1/00 | (2006.01) |
| B60L 3/00 | (2019.01) |
| B60L 50/60 | (2019.01) |
| H02J 7/00 | (2006.01) |
| H02P 3/00 | (2006.01) |
| H02P 5/00 | (2016.01) |

(52) U.S. Cl.
CPC ............. *B60L 3/0084* (2013.01); *B60L 50/60* (2019.02); *H02J 7/0063* (2013.01)

(58) Field of Classification Search
CPC ........ B60L 3/0084; B60L 50/60; H02J 7/0063
USPC .......................................................... 318/139
See application file for complete search history.

(56) References Cited

U.S. PATENT DOCUMENTS

| | | | |
|---|---|---|---|
| 8,587,907 B2 | 11/2013 | Gaben | |
| 9,789,782 B2 | 10/2017 | Holgers et al. | |
| 9,889,751 B2 | 2/2018 | Jang et al. | |
| 11,021,065 B2 | 6/2021 | Waag et al. | |
| 2012/0056478 A1* | 3/2012 | Omoto | B60L 58/10 307/11 |
| 2015/0194707 A1* | 7/2015 | Park | H01M 10/425 429/61 |
| 2015/0372279 A1 | 12/2015 | Li | |
| 2020/0274375 A1* | 8/2020 | Griffiths | H02J 7/24 |

FOREIGN PATENT DOCUMENTS

| | | |
|---|---|---|
| EP | 3595076 | 5/2020 |
| WO | 2022068690 | 4/2022 |

* cited by examiner

*Primary Examiner* — Erick D Glass

(57) ABSTRACT

An electrical system for providing electrical power to an electric machine, where the electrical system includes a single point disconnect switch for multiple battery systems. The single point disconnect switch may be remotely mounted. In some examples, operation of the disconnect switch disconnects a first battery system, e.g., a 12 VDC nominal battery system, which, in turn, causes a disconnection of a second battery system, e.g., a 48 VDC nominal battery system.

20 Claims, 3 Drawing Sheets

SINGLE DISCONNECT SWITCH FOR MULTIPLE BATTERY SYSTEMS

TECHNICAL FIELD

This document relates generally to electric machines and more particularly to battery systems to power electric machines.

BACKGROUND

Electric machines may be powered by batteries to operate or propel the machines. Such electric machines may use a plurality of batteries to supply energy to motors in order to drive the vehicle, such as by rotating wheels or tracks of the machine. The batteries may include battery cells contained in a battery module. A plurality of battery modules may be arranged into a battery pack.

Battery-operated electric machines provide many advantages over combustion engine machines. One advantage is that battery-operated machines do not emit combustion byproducts. This advantage is particularly useful in underground mining environments. A combustion-engine underground-mining machine may often need to be paired with ventilation systems that provide fresh air to the machine and that carry away the combustion exhaust aboveground.

U.S. Pat. No. 11,021,065 describes a battery system for an electric vehicle having a high-voltage battery, a control unit, and a safety device for disconnecting the high-voltage battery from a high-voltage on-board electrical system of the electric vehicle. The battery system is characterized in that the control unit has two conductor loops, and that the control unit carries out a monitoring of the two conductor loops. Based on the monitoring, the control unit activates the safety device such that the safety device separates the high-voltage battery from the high-voltage vehicle electrical system of the electric vehicle, wherein the safety device has an irreversible separating element.

SUMMARY

This disclosure describes, among other things, an electrical system for providing electrical power to an electric machine, where the electrical system includes a single point disconnect switch for multiple battery systems.

In an aspect, this disclosure is directed to an electrical system for providing electrical power to an electric machine, the electrical system comprising: a first battery system configured to supply first power to a component of the electric machine, the first battery system comprising: a first battery module having at least one battery cell, wherein the at least one battery cell is configured to generate a first voltage; an output coupled to the first battery module and configured to supply the first power to the component; a first electronic control module coupled to the first battery module, wherein the first electronic control module is configured to receive a representation of at least one electrical parameter of the first battery module; a second electronic control module in electrical communication with the first battery system, wherein the second electronic control module is configured to receive the representation of the at least one electrical parameter of the first battery module, and wherein the first battery system is configured to supply second power to the second electronic control module; a second battery system including at least one battery cell, wherein the at least one battery cell is configured to generate a second voltage less than the first voltage, and wherein the second battery system is configured to generate and supply third power to the second electronic control module; and only one manual disconnect switch, wherein the manual disconnect switch is electrically coupled between the second battery system and the second electronic control module, and wherein operation of the manual disconnect switch from a first position to a second position: prevents the second electronic control module from receiving the second power from the first battery system and third power from the second battery system; and causes the first battery system to stop supplying the first power to the output.

In another aspect, this disclosure is directed to a method of providing electrical power to an electric machine, the method comprising: receiving, via an electronic control module, first power from a first battery system or second power from a second battery system, wherein the first battery system is configured to generate a first voltage, and wherein the second battery system is configured to generate a second voltage different than the first voltage; in response to the electronic control module receiving the first power from the first battery system or the second power from the second battery system: providing, via the electronic control module, an electrical signal to the first battery system; generating and supplying, via the first battery system, third power to an output of the first battery system, wherein the output of the first battery system is coupled to a component of the electric machine; operating only one manual disconnect switch from a first position to a second position, wherein the manual disconnect switch is electrically coupled between the first battery system and the electronic control module; and in response to operating the manual disconnect switch from the first position to the second position: preventing the second electronic control module from receiving first power from the first battery system and second power from the second battery system; and preventing the supplying, via the first battery system, the third power to the output of the first battery system.

In yet another aspect, this disclosure is directed to an electrical system for providing electrical power to an electric machine, the electrical system comprising: a first battery system configured to supply first power to an electric motor of the electric machine, the first battery system comprising: a first battery module having at least one battery cell, wherein the at least one battery cell is configured to generate a first voltage, where the first voltage is less than 60 VDC; an output coupled to the first battery module and configured to supply the first power to the electric motor; a first electronic control module coupled to the first battery module; a second electronic control module in electrical communication with the first battery system, wherein the first battery system is configured to supply second power to the second electronic control module; a second battery system including at least one battery cell, wherein the at least one battery cell is configured to generate a second voltage, wherein the second voltage is less than 12 VDC, and wherein the second battery system is configured to generate and supply third power to the second electronic control module; and only one manual disconnect switch, wherein the manual disconnect switch is electrically coupled between the second battery system and the second electronic control module, and wherein operation of the manual disconnect switch from a first position to a second position: prevents the second electronic control module from receiving the second power from the first battery system and third power from the second battery system; and causes the first battery system to stop supplying the first power to the output.

DETAILED DESCRIPTION

The present inventors have recognized that packaging a single point disconnect switch for high current battery systems on compact equipment, e.g., industrial vehicles, can be very challenging because the disconnect switch itself is large, expensive, and the circuits on which the disconnect switch needs to act may not be easily physically accessed by the end user. In addition, although battery systems less than a nominal DC voltage of 60 volts ("VDC") do not require a single point disconnect from a regulatory perspective, a single point disconnect may be desirable for end user convenience.

This disclosure describes, among other things, an electrical system for providing electrical power to an electric machine, where the electrical system includes a single point disconnect switch for multiple battery systems. The single point disconnect switch may be remotely mounted. In some examples, operation of the disconnect switch disconnects a first battery system, e.g., a 12 VDC nominal battery system, which, in turn, causes a disconnection of a second battery system, e.g., a 48 VDC nominal battery system. For example, opening the disconnect switch causes an electronic control module (ECM) to lose power, which prevents it from communicating with the 48 VDC nominal battery system. The 48 VDC nominal battery system detects that the ECM is no longer communicating and automatically disables the 48 VDC nominal battery system.

Figure 1:
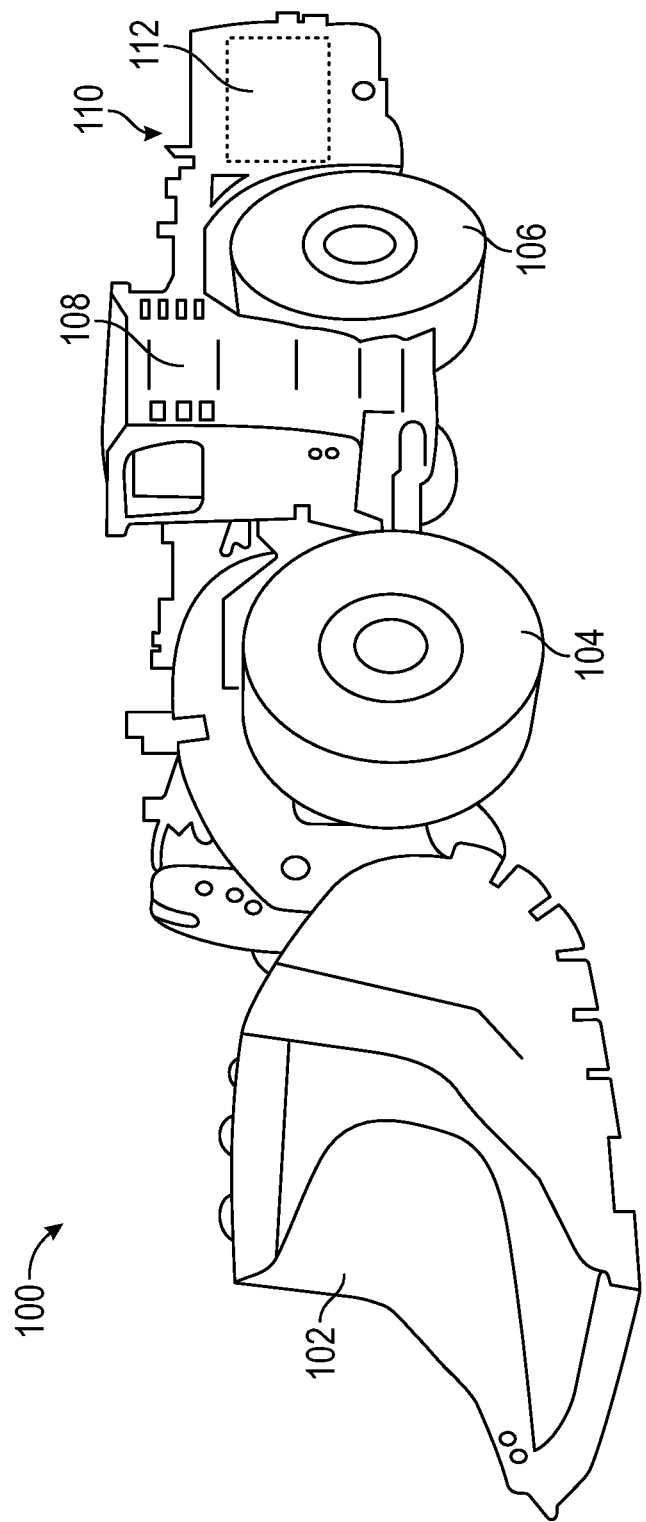
FIG. 1 is a perspective view of an example of an electric machine that can implement various dual active bridge DC converter techniques of this disclosure.

FIG. 1 is a perspective view of an example of an electric machine 100 that can implement various techniques of this disclosure. FIG. 1 depicts a non-limiting of an electric machine 100 in the form of a load-haul-dump (LHD) vehicle including a dump bucket 102, wheels 104, 106, an operator control cabin 108, and a vehicle body 110.

The electric machine 100 also includes a battery system 112. The battery system 112 can supply power to, among other things, an electric motor. The electric motor can supply power to one or more control systems, such as a control system configured to operate various hydraulics of the dump bucket 102. The techniques of this disclosure are not limited to the LHD vehicles and are instead applicable to other industrial vehicles including, but not limited to, continuous miners, feeder breakers, roof bolters, utility vehicles for mining, underground mining loaders, underground articulated trucks, or any other vehicle used for industrial purposes, such as hauling, excavating, drilling, loading, dumping, compacting, etc.

Using various techniques of this disclosure, described below, a single point disconnect switch is used to disconnect power supplied by multiple battery systems. The techniques of this disclosure utilize a chain reaction by disconnecting on a low voltage side that, in turn, disables a main ECM that, in turn, no longer provides an electrical path between the main ECM and a first battery system. Eliminating a separate manual disconnect switch for the first battery system permits additional batteries to be added to the electrical system 200. In this manner, the techniques of this disclosure reduce or minimize the number of devices that need to be packaged in the electric machine, thereby overcoming a space constraint challenge.

Figure 2:
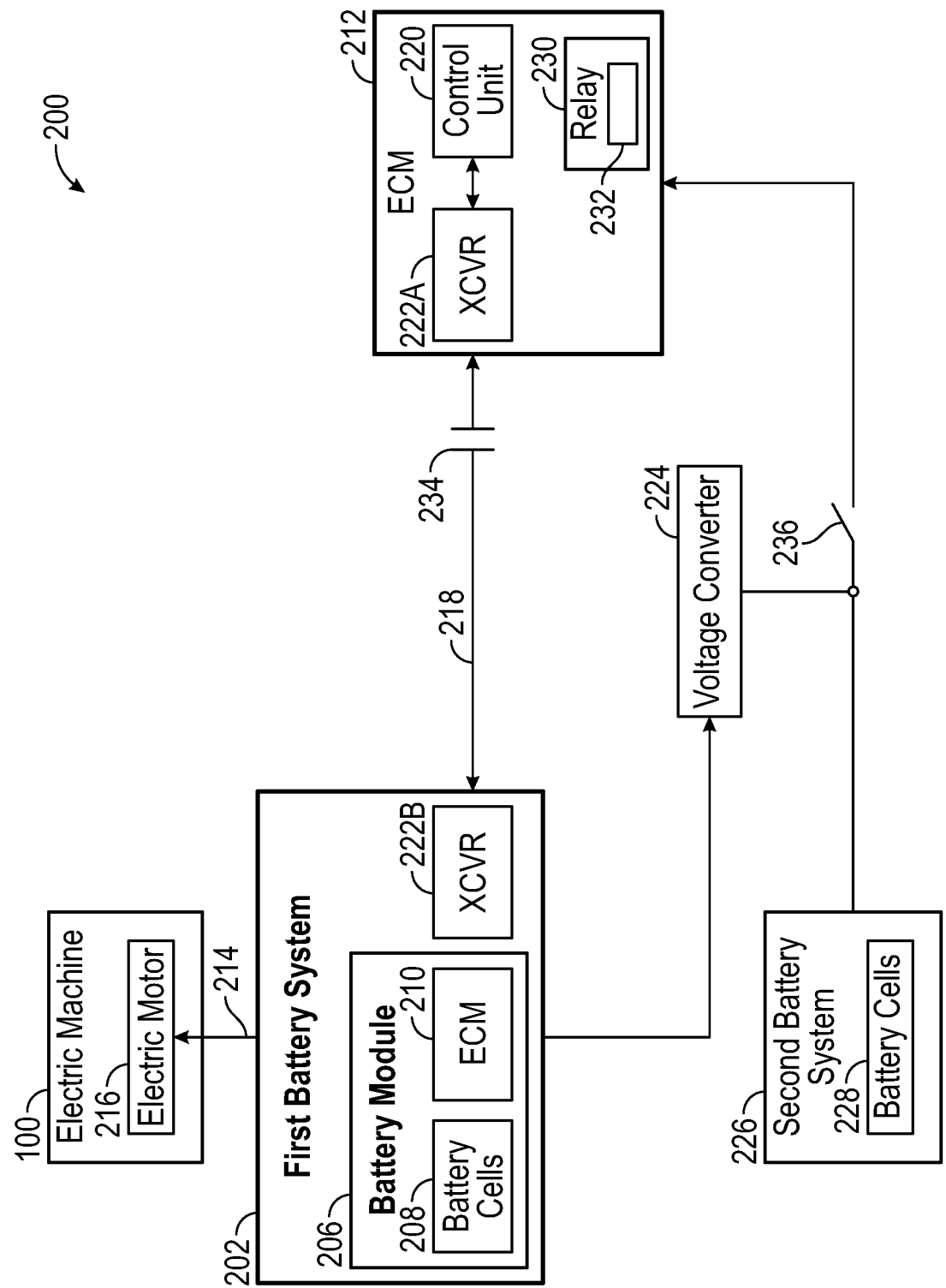
FIG. 2 is a block diagram of an example of an electrical system for providing electrical power to an electric machine.

FIG. 2 is a block diagram of an example of an electrical system 200 for providing electrical power to an electric machine. The electrical system 200 can include a first battery system 202, such as the battery system 112 of FIG. 1, and a second battery system 226. The first battery system 202 can include a first battery module 206 that includes one or more battery cells 208, e.g., rechargeable battery cells, and an electronic control module (ECM) 210. The ECM 210 performs various functions to manage the first battery system 202.

The one or more battery cells 208 are configured to generate a first voltage, such as a nominal voltage less than 60 VDC. e.g., 48 VDC, or a nominal voltage less than 900 VDC. The ECM 210 is configured to, among other things, receive a representation of one or more electrical parameters of the first battery module 206, such as a voltage associated with the battery cells 208, and communicate with a main ECM 212, which controls various functions of the electric machine 100.

The first battery system 202 includes an output 214 coupled to the first battery module 206 and configured to supply a power to a component 216, e.g., an electric motor, of the electric machine 100. The component 216. e.g., an electric motor, of the electric machine 100 is the next downstream item from the output 214. The electric motor can supply power to one or more control systems, such as a hydraulic control system configured to operate the dump bucket 102 of FIG. 1.

The main ECM 212 is in electrical communication via an electrical path 218 with the first battery system 202, such as using a control unit 220. In some examples, the electrical path 218 is provided using a transceiver 222A in the main ECM 212 and a transceiver 222B in the first battery system 202. The main ECM 212 is configured to receive the representation of the electrical parameter(s) of the first battery module, e.g., a voltage, and determine a state of health, a state of charge, and the like, for example. In addition, the main ECM 212 receives power supplied by the first battery system 202. In some examples, the main EMC 212 receives power supplied by the first battery system 202 after a voltage converter circuit 224 converts a voltage of the first battery system 202.

The electrical system 200 includes a second battery system 226, such as including a lead acid battery. The second battery system 226 includes at least one battery cell 228, where the battery cell 228 is configured to generate a second voltage less than the first voltage of the first battery system 202. The second battery system 226 can have a nominal voltage less than 30 VDC, e.g., 12 VDC. The second battery system 226 is configured to generate and supply power to the main ECM 212. For example, the second battery system 226 is configured to supply power to the main ECM 212, which in turn, brings the first battery system 202 online.

The control unit 220 of the main ECM 212 can generate and transmit an electrical command signal over the electrical path 218 to the ECM 210 of the first battery system 202 when the main ECM 212 is receiving power from the first battery system 202 or power from the second battery system 226. If the ECM 210 of the first battery system 202 stops receiving the command signal or if that command signal tells the ECM 210 to turn off, then the first battery module 206 performs an internal disconnection operation, which causes, among other things, the first battery system 202 to stop supplying power to the output 214.

In some examples, the electrical command signal is a datalink enablement command signal. The control unit 220 can generate a datalink enablement command signal and transmit the command signal via a transceiver 222A to a transceiver 222B in the first battery system 202.

In other examples, the electrical command signal is a direct electrical signal generated by the control unit 220, such as a ground signal, a 5V signal, a pulse width modulated (PWM) signal, a 12V signal, etc.

In yet other examples, the main ECM 212 can include a relay 230 having a relay coil 232 and a contact 234, where the electrical communication between the main ECM 212 and the first battery system 202 includes the contact 234. The relay coil 232 is configured to receive power from either the first battery system 202 or power from the second battery system 226 keep the contact 234 closed while receiving power. The control unit 220 can generate an electrical command signal, e.g., direct electrical signal, that can be transmitted to the first battery system 202 through the closed contact.

In accordance with this disclosure, the electrical system 200 includes only one manual disconnect switch 236, such as a rotary switch. In some examples, the manual disconnect switch 236 includes a lock configured to be open with a key. The main chassis ground of the electric machine 100 of FIG. 1 may pass through the manual disconnect switch 236.

The single point manual disconnect switch 236 is electrically coupled between the second battery system 226 and the main ECM 212. User operation of the manual disconnect switch from a first position, e.g., closed, to a second position, e.g., open, 1) prevents the main ECM 212 from receiving power from either the first battery system 202 or the second battery system 226, and 2) causes the first battery system 202 to stop supplying power to the output 214. In some examples, the manual disconnect switch 236 also disconnects second battery system 226 from the chassis of the electric machine 100.

In addition, in configurations that include a relay 230, the relay coil 232 is configured to open the contact 234 and disconnect the electrical path 218 between the main ECM 212 and the first battery system 202 when the manual disconnect switch 236 is operated from a first position, e.g., closed, to a second position, e.g., open.

If a user opens the manual disconnect switch 236 during operation, the main ECM 212 loses power and, as a result, the electrical path 218 between the main ECM 212 and the first battery system 202 is interrupted. For example, to interrupt the electrical path 218, the control unit 220 stops sending a command signal, e.g., a datalink command signal or direct electrical signal, or the relay coil 232 opens the contact 234. Then, the first battery system 202 will go through a shutdown sequence to disconnect itself from its outputs, such as the output 214.

In another scenario, a user performing maintenance or otherwise working on the electric machine 100 may have already operated the manual disconnect switch 236 and physically locked out the electric machine 100. By using the techniques of this disclosure, there is no way for the first battery system 202 to come online without first reestablishing the electrical path 218 between the first battery system 202, e.g., the ECM 210 of the first battery system 202, and the main ECM 212, such as by receiving a command signal. Thus, the manual disconnect switch 236 allows a user to perform a disconnect when the electrical system 200 is powered (or "hot") and prevents an unintentional reconnection by locking out the manual disconnect switch 236.

Rather than have a separate manual disconnect switch for the first battery system 202, the techniques of the disclosure use only the manual disconnect switch 236 coupled to the second battery system 226 and some additional logic and controls that cause the first battery system 202 to disconnect. The techniques of this disclosure utilize a chain reaction by disconnecting on a low voltage side that, in turn, disables the main ECM 212 that, in turn, no longer provides the electrical path 218 between the main ECM 212 and first battery system 202.

Eliminating a separate manual disconnect switch for the first battery system 202 permits additional batteries to be added to the electrical system 200. In this manner, the techniques of this disclosure reduce or minimize the number of devices that need to be packaged in the electric machine 100, thereby overcoming a space constraint challenge.

Figure 3:
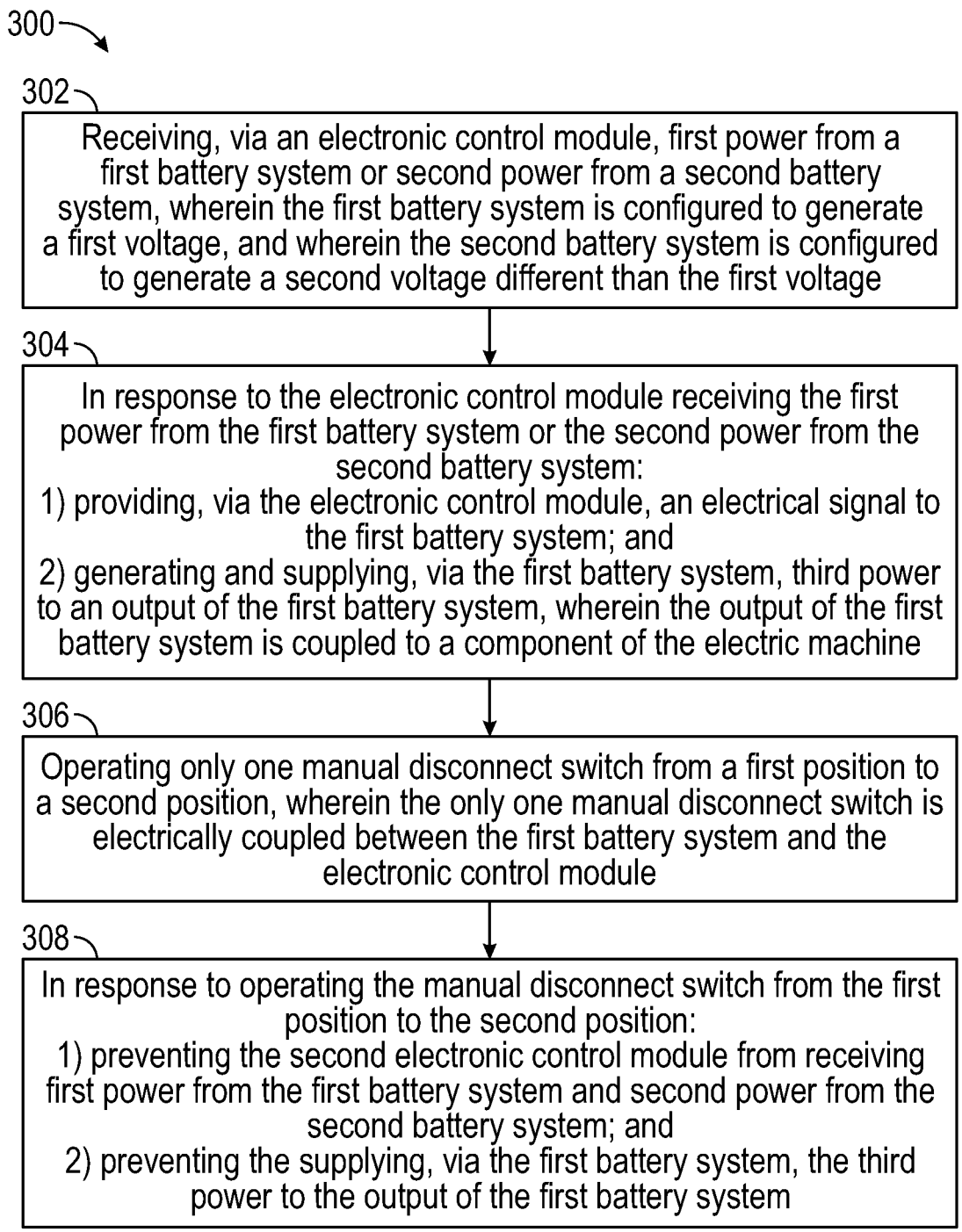
FIG. 3 is a flow diagram of an examples of a method of providing electrical power to an electric machine.

FIG. 3 is a flow diagram of an examples of a method 300 of providing electrical power to an electric machine. At block 302, the method 300 includes receiving, via an electronic control module, first power from a first battery system or second power from a second battery system, where the first battery system is configured to generate a first voltage, and where the second battery system is configured to generate a second voltage different than the first voltage. For example, the main ECM 212 can receive power from the first battery system 202 or power from the second battery system 226. The first battery system 202 is configured to generate a voltage higher than a voltage generated by the second battery system 226.

At block 304, in response to the electronic control module receiving the first power from the first battery system or the second power from the second battery system, the method 300 includes: 1) providing, via the electronic control module, an electrical signal to the first battery system; and 2) generating and supplying, via the first battery system, third power to an output of the first battery system, wherein the output of the first battery system is coupled to a component of the electric machine. For example, in response to the main ECM 212 receiving power from the first battery system 202 or power from the second battery system 226, the main ECM 212 provides an electrical signal, such as a command signal, to the first battery system 202.

At block 306, the method 300 includes operating only one manual disconnect switch from a first position to a second position, where the only one manual disconnect switch is electrically coupled between the first battery system and the electronic control module. For example, a user can operate the single point manual disconnect switch 236 from a closed position to an open position, where the manual disconnect switch 236 is electrically coupled between the first battery system 202 and the main ECM 212.

At block 308, in response to operating the manual disconnect switch from the first position to the second position, the method 300 includes: 1) preventing the second electronic control module from receiving first power from the first battery system and second power from the second battery system; and 2) preventing the supplying, via the first battery system, the third power to the output of the first battery system. For example, operating the manual disconnect switch 236 from the closed position to the open position 1) prevents the main ECM 212 form receiving power from both the first battery system 202 and second battery system 226; and 2) prevents the first battery system 202 from supplying power to its output 214.

INDUSTRIAL APPLICABILITY

Using various techniques of this disclosure, a single point disconnect switch is used to disconnect power supplied by multiple battery systems. The techniques of this disclosure utilize a chain reaction by disconnecting on a low voltage side that, in turn, disables a main ECM that, in turn, no longer provides an electrical path between the main ECM and a first battery system.

Eliminating a separate manual disconnect switch for the first battery system permits additional batteries to be added to the electrical system 200. In this manner, the techniques of this disclosure reduce or minimize the number of devices that need to be packaged in the electric machine, thereby overcoming a space constraint challenge.

The above detailed description is intended to be illustrative, and not restrictive. The scope of the disclosure should, therefore, be determined with references to the appended claims, along with the full scope of equivalents to which such claims are entitled.

What is claimed is:

1. An electrical system for providing electrical power to an electric machine, the electrical system comprising:
   a first battery system configured to supply a first power to a component of the electric machine, the first battery system comprising:
      a first battery module having at least one first battery cell, wherein the at least first one battery cell is configured to generate a first voltage;
      an output coupled to the first battery module and configured to supply the first power to the component;
      a first electronic control module coupled to the first battery module, wherein the first electronic control module is configured to receive a representation of at least one electrical parameter of the first battery module;
   a second electronic control module in electrical communication with the first battery system, wherein the second electronic control module is configured to receive the representation of the at least one electrical parameter of the first battery module, and wherein the first battery system is configured to supply a second power to the second electronic control module;
   a second battery system including at least one second battery cell, wherein the at least one second battery cell is configured to generate a second voltage less than the first voltage, and wherein the second battery system is configured to generate and supply third power to the second electronic control module; and
   only one manual disconnect switch, wherein the manual disconnect switch is electrically coupled between the second battery system and the second electronic control module, and wherein operation of the manual disconnect switch from a first position to a second position:
      prevents the second electronic control module from receiving the second power from the first battery system and the third power from the second battery system; and
      causes the first battery system to stop supplying the first power to the output.

2. The electrical system of claim 1, wherein the second electronic control module includes:
   a control unit configured to generate and output a command signal to the first battery system when the second electronic control module is receiving the second power from the first battery system or the third power from the second battery system.

3. The electrical system of claim 1, wherein the second electronic control module includes:
   a relay including a relay coil and a contact,
   wherein the electrical communication between the second electronic control module and the first battery system includes the contact,
   wherein the relay coil is configured to receive the second power from the first battery system or the third power from the second battery system, and
   wherein the relay coil is configured to open the contact and disconnect the electrical communication between the second electronic control module and the first battery system when the manual disconnect switch is operated from a first position to a second position.

4. The electrical system of claim 1, wherein the manual disconnect switch is a rotary switch.

5. The electrical system of claim 1, wherein the manual disconnect switch includes a lock configured to be open with a key.

6. The electrical system of claim 1, further comprising:
   a voltage converter circuit electrically coupled between the first battery system and the second electronic control module.

7. The electrical system of claim 1, wherein the first voltage is less than 60 VDC.

8. The electrical system of claim 1, wherein the first voltage is less than 900 VDC.

9. The electrical system of claim 1, wherein the second voltage is less than or equal to 30 VDC.

10. The electrical system of claim 1, wherein the component of the electric machine is an electric motor.

11. A method of providing electrical power to an electric machine, the method comprising:
    receiving, via an electronic control module, a first power from a first battery system or a second power from a second battery system, wherein the first battery system is configured to generate a first voltage, and wherein the second battery system is configured to generate a second voltage different than the first voltage;
    in response to the electronic control module receiving the first power from the first battery system or the second power from the second battery system:
       providing, via the electronic control module, an electrical signal to the first battery system;
       generating and supplying, via the first battery system, a third power to an output of the first battery system, wherein the output of the first battery system is coupled to a component of the electric machine;
    operating only one manual disconnect switch from a first position to a second position, wherein the manual disconnect switch is electrically coupled between the first battery system and the electronic control module; and
    in response to operating the manual disconnect switch from the first position to the second position:
       preventing the second electronic control module from receiving the first power from the first battery system and the second power from the second battery system, and
       preventing the supplying, via the first battery system, the third power to the output of the first battery system.

12. The method of claim 11, further comprising:
    generating and outputting a command signal to the first battery system when the second electronic control module is receiving the second power from the first battery system or the third power from the second battery system.

13. The method of claim 11, further comprising:
receiving, via a relay coil, the second power from the first battery system or the third power from the second battery system; and
opening a contact and disconnecting an electrical communication between the second electronic control module and the first battery system when the manual disconnect switch is operated from the first position to the second position.

14. The method of claim 11, further comprising:
coupling a voltage converter circuit electrically between the first battery system and the second electronic control module.

15. The method of claim 11, wherein operating only one manual disconnect switch from the first position to the second position includes:
operating a rotary switch from the first position to the second position.

16. The method of claim 11, further comprising:
locking the manual disconnect switch.

17. The method of claim 11, comprising:
providing the electrical power to an electric motor of the electric machine.

18. An electrical system for providing electrical power to an electric machine, the electrical system comprising:
a first battery system configured to supply a first power to an electric motor of the electric machine, the first battery system comprising:
a first battery module having at least one first battery cell, wherein the at least one first battery cell is configured to generate a first voltage, where the first voltage is less than 60 VDC;
an output coupled to the first battery module and configured to supply the first power to the electric motor;
a first electronic control module coupled to the first battery module:
a second electronic control module in electrical communication with the first battery system, wherein the first battery system is configured to supply a second power to the second electronic control module;
a second battery system including at least one second battery cell, wherein the at least one second battery cell is configured to generate a second voltage, wherein the second voltage is less than 30 VDC, and wherein the second battery system is configured to generate and supply a third power to the second electronic control module; and
only one manual disconnect switch, wherein the manual disconnect switch is electrically coupled between the second battery system and the second electronic control module, and wherein operation of the manual disconnect switch from a first position to a second position:
prevents the second electronic control module from receiving the second power from the first battery system and the third power from the second battery system; and
causes the first battery system to stop supplying the first power to the output.

19. The electrical system of claim 18, wherein the second electronic control module includes:
a control unit configured to generate and output a command signal to the first battery system when the second electronic control module is receiving the second power from the first battery system or the third power from the second battery system.

20. The electrical system of claim 18, wherein the manual disconnect switch includes a lock configured to be open with a key.

* * * * *